A. T. SAUNDERS.
PLAYING BALL.
APPLICATION FILED MAR. 8, 1911.
1,080,592.
Patented Dec. 9, 1913.
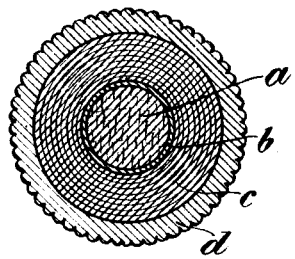

UNITED STATES PATENT OFFICE.

ADDISON T. SAUNDERS, OF AKRON, OHIO, ASSIGNOR TO A. G. SPALDING & BROS., OF JERSEY CITY, NEW JERSEY, A CORPORATION OF NEW JERSEY.

PLAYING-BALL.

1,080,592.  Specification of Letters Patent.  Patented Dec. 9, 1913.

Application filed March 8, 1911. Serial No. 613,030.

*To all whom it may concern:*

Be it known that I, ADDISON T. SAUNDERS, a citizen of the United States, residing in Akron, in the State of Ohio, have invented certain new and useful Improvements in Playing-Balls, of which the following is a specification, reference being had to the accompanying drawing, forming a part hereof.

This invention relates to balls, such as those which are used in various games and especially in the game of golf, which must be possessed of considerable resilience and, being struck from time to time with bats or clubs, are liable to momentary deformation. Such balls usually have a relatively small core upon which is formed, usually by winding rubber thread under tension, a more or less resilient body, a shell or cover of gutta-percha or other suitable material being molded upon the resilient body. The cores of such balls have been formed heretofore of various substances, such as hard, vulcanized rubber or gutta-percha, unvulcanized or pure rubber in solid form and pure rubber thread wound to form a small ball. All of these cores, although somewhat yielding and resilient, nevertheless substantially retain their shape, especially under the compression to which they are subjected by the body of the ball, and are generally called hard cores. The advantages of soft cores, that is, cores formed of a substance which is more or less mobile in character, so that, when the balls are struck, the cores shall be readily capable of deformation, have been recognized generally and various attempts have been made to provide satisfactory soft cores. Thus balls have been made with cores which consist of rubber bags filled with water or some other suitable liquid, mineral salts in solution being added to increase the specific gravity. Balls have also been made with cores which consist of similar bags filled with oil or with a saponaceous compound, with metal filings or other mineral substances to increase the specific gravity. Cores have also been made of soft rubber "dough" composed of raw rubber mixed with mineral and oils. It has been found, however, that with "water cores" or rubber balls filled with water or other liquid there is, in use, more or less seepage or percolation of the water from the core which results in loss of size and of weight in the core and eventually, through the drying out of the water, in loss of weight in the body itself; and that with cores formed of balls containing oil or saponaceous compounds, there is not only some loss of weight and size in the cores themselves, but a deterioration of the quality of the body through the action thereon of the oils and liquid constituents of the saponaceous compounds, resulting sometimes in the loosening of the paint on the cover; while with cores formed of soft rubber dough composed of raw rubber mixed with minerals and oils, there is also a loss of size and weight in the cores, and a still more rapid deterioration of the bodies of the balls through the action of the oils which are gradually separated from the soft rubber and penetrate the body of the ball.

It is the object of this invention to provide playing balls of the character referred to having cores which are sufficiently soft, that is, mobile or semi-fluid in character, to permit the advantages of soft cores to be realized, while the disadvantages incident to the use of the soft cores heretofore devised are obviated. To this end the improved cores are made of a soft, vulcanized rubber compound, that is, a compound of soft or pure rubber, sulfur and a softening agent, such at petrolatum, or a suitable oil, mixed in such proportions as to produce the desired degree of softness, and subsequently vulcanized. The degree of softness of the core thus secured is greater than in the ordinary vulcanized rubber cores, so that the desired mobile character is secured, and, at the same time, the compound is permanent so that there is no separation of any of the constituents thereof in use. The soft core thus produced therefore retains its size and weight and yields nothing which affects the character of the body of the ball. The desired specific gravity of the core may be secured by adding to the compound, before vulcanization, litharge or other suitable substances.

The invention will be more fully explained hereinafter with reference to the accompanying drawing, the single figure of which represents, in section, a golf ball having the improved core.

In the ball shown in the drawing the soft core *a*, formed as described herein, may have a primary wrapping, as of a short length of relatively wide rubber tape *b*, especially if the core is not molded in spherical form but is cut from a block of the vulcanized compound and should be given a spherical form. Upon the core, whether with or without the wrapping of tape, is formed the body c, preferably by winding rubber thread under tension and outside of the body may be the shell or cover d, usually, in the case of a golf ball, of gutta-percha or other plastic material molded on the body.

In the preferred manner of making the improved core, a quantity of raw rubber is broken down upon warm mixing rolls or in a dough mill and mixed with a suitable proportion of litharge or other comminuted mineral to give the desired weight, and with oil, petrolatum or other suitable softening agent in such proportion as to secure the degree of softness required, sufficient sulfur being added for vulcanization. The relative quantity of softening agent employed may vary within quite wide limits according to the result to be produced. When the compound has thus been formed it is cured or vulcanized either in spherical molds of the proper size or in blocks or slabs from which pieces of suitable size to from cores may be cut and afterward wound with rubber tape to secure the proper shape for the application of the body, usually by the winding on of rubber thread under tension. A satisfactory mixture for the core of a golf ball of a desirable weight and behavior, may consist of sixteen parts by weight of raw rubber of good quality, eight parts of petrolatum, seventeen parts of litharge, and one part of sulfur, but obviously the proportion of litharge or other mineral will be increased or diminished according to the weight which is desired and satisfactory results, according to the results desired, have also been secured by using oil in widely different proportions. It will be evident, therefore, that the invention is not restricted to any particular softening agent or to any particular weighting material, or to any particular proportions of the softening agent and raw rubber.

I claim as my invention:

1. A playing ball having a core of a soft vulcanized compound of rubber impregnated with a non-volatile hydrocarbon softening agent, and a body formed thereon.

2. A playing ball having a core of a soft vulcanized compound of rubber impregnated with a non-volatile hydrocarbon softening agent, and a body of rubber thread wound thereon.

This specification signed and witnessed this 4th day of March A. D., 1911.

ADDISON T. SAUNDERS.

Signed in the presence of—
 CLARENCE H. ARCHER,
 EARL C. DANIELS.